United States Patent
Sampathkumar et al.

(10) Patent No.: US 9,239,679 B2
(45) Date of Patent: Jan. 19, 2016

(54) SYSTEM FOR EFFICIENT CACHING OF SWAP I/O AND/OR SIMILAR I/O PATTERN(S)

(71) Applicant: LSI Corporation, San Jose, CA (US)

(72) Inventors: Kishore Kaniyar Sampathkumar, Bangalore (IN); Saugata Das Purkayastha, Bangalore (IN); Parag R. Maharana, Fremont, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 200 days.

(21) Appl. No.: 14/145,943

(22) Filed: Jan. 1, 2014

(65) Prior Publication Data

US 2015/0178201 A1   Jun. 25, 2015

Related U.S. Application Data

(60) Provisional application No. 61/918,104, filed on Dec. 19, 2013.

(51) Int. Cl.
  *G06F 12/08* (2006.01)
  *G06F 3/06* (2006.01)

(52) U.S. Cl.
  CPC .............. *G06F 3/06* (2013.01); *G06F 12/0804* (2013.01); *G06F 12/0871* (2013.01); *G06F 2212/1016* (2013.01); *G06F 2212/284* (2013.01); *G06F 2212/313* (2013.01)

(58) Field of Classification Search
  CPC .............. G06F 12/123; G06F 12/0866; G06F 12/0871; G06F 12/122; G06F 2212/222; G06F 12/0804; G06F 12/0808; G06F 2212/1016; G06F 2212/284; G06F 2212/313; G06F 3/06
  See application file for complete search history.

(56) References Cited

U.S. PATENT DOCUMENTS

| | | | |
|---|---|---|---|
| 5,467,460 A * | 11/1995 | Patel ................... | G06F 12/0804 711/143 |
| 8,312,250 B2 | 11/2012 | Forhan et al. .................. | 711/216 |
| 8,364,881 B2 | 1/2013 | Urabe ............... | 711/5 |
| 8,495,285 B2 | 7/2013 | Varanasi ...................... | 711/103 |
| 8,583,865 B1 * | 11/2013 | Sade et al. ............ | G06F 11/108 711/103 |
| 2013/0318283 A1 | 11/2013 | Small et al. ................... | 711/103 |
| 2013/0326113 A1 | 12/2013 | Wakrat et al. ................. | 711/103 |
| 2013/0332697 A1 | 12/2013 | Hiwatashi et al. ............ | 711/173 |
| 2013/0339579 A1 | 12/2013 | Oh ................................ | 711/103 |
| 2014/0237160 A1 * | 8/2014 | Dong .................. | G06F 12/0864 711/102 |

* cited by examiner

*Primary Examiner* — Hashem Farrokh

(57) ABSTRACT

An apparatus comprising a memory and a controller. The memory may be configured to (i) implement a cache and (ii) store meta-data. The cache may comprise one or more cache windows. Each of the one or more cache windows comprises a plurality of cache-lines configured to store information. The controller is connected to the memory and configured to (A) process normal read/write operations in a first mode and (B) process special read/write operations in a second mode by (i) tracking a write followed by read condition on each of said cache windows and (ii) discarding data on the cache-lines associated with the cache windows after completion of the write followed by a read condition on the cache-lines.

14 Claims, 4 Drawing Sheets

SYSTEM FOR EFFICIENT CACHING OF SWAP I/O AND/OR SIMILAR I/O PATTERN(S)

This application relates to U.S. Provisional Application No. 61/918,104, filed Dec. 19, 2013, which relates to co-pending U.S. application Ser. No. 14/132,440 filed Dec. 18, 2013, each of which are hereby incorporated by reference in their entirety.

FIELD OF THE INVENTION

The invention relates to data storage generally and, more particularly, to a method and/or apparatus for implementing system for efficient caching of swap I/O and/or similar I/O pattern(s).

BACKGROUND

Conventional flash based caching implementations have a uniform way of handling cached information. A certain amount of I/O requests issued on data blocks in a defined spatial locality within a specified amount of time (or I/Os) makes them "hot". The "hot" data is then cached on flash devices (such as SSDs), henceforth also termed Cache Devices. The corresponding cache is first made valid by reading the data blocks on the backend disk/VD, where VD stands for "Virtual Device". The terms "backend disk" and VD shall henceforth be used interchangeably. Once the cache is valid, corresponding I/O reads are fetched from the cache device. All I/O writes are directly written only to the cache device and not written to the backend disk in a caching mode called Write-Back (WB) whereas they are written both to the cache device and the VD in a caching mode called Write-Through (WT). Hot data is tracked via a "heat index". When data that is hot is no longer accessed as frequently when compared to other data (that may have become "hotter"), the "heat index" is reduced. Once the heat index is sufficiently low and there is not enough room for other data that has a higher "heat index", the cache gets replaced with 'hotter' data.

SUMMARY

The invention concerns an apparatus comprising a memory and a controller. The memory may be configured to (i) implement a cache and (ii) store meta-data. The cache may comprise one or more cache windows. Each of the one or more cache windows comprises a plurality of cache-lines configured to store information. The controller is connected to the memory and configured to (A) process normal read/write operations in a first mode and (B) process special read/write operations in a second mode by (i) tracking a write followed by a read condition on each of said cache windows and (ii) discarding data on the cache-lines associated with the cache windows after completion of the write followed by a read condition on the cache-lines.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing a system and method for efficient caching of swap I/O and/or similar I/O patterns that may (i) implement a tracking field and/or (ii) be implemented as one or more integrated circuits.

The invention proposes new tracking fields and associated methods to track I/O requests for a "write followed by a read" operation on cache-lines in the respective cache windows involved. On completion of the I/O requests, the cache-lines are invalidated. In order to enable the operation, a special Write Once Read Once flag (e.g., WONRON) is introduced at different levels (e.g., at the virtual device (VD) level, at the logical block address (LBA) range level), and/or as an "in-band" hint with each I/O.

A new bitmap may contain the flag WONRON. The flag WONRON may be introduced in each cache window tracking structure to track an operation (e.g., WRITE) followed by an operation (e.g., READ) before doing a DISCARD of the data cache-lines. Each bit tracks the I/O pattern of interest at the level of a single cache-line.

Figure 1:
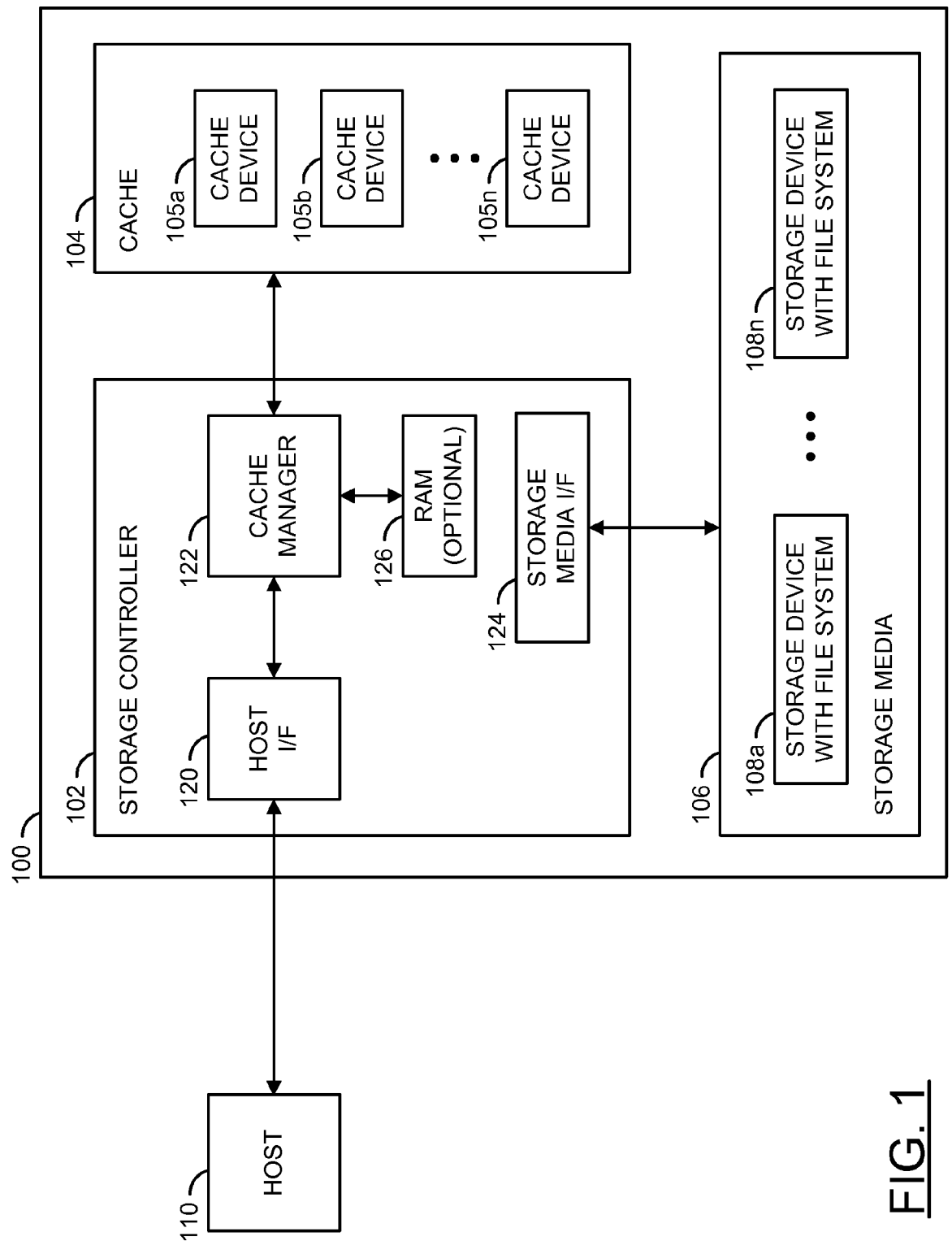
FIG. 1 is a diagram of a context of the invention.

Referring to FIG. 1, a diagram of a system 100 is shown illustrating an example storage system in accordance with an embodiment of the invention. In various embodiments, the system 100 comprises a block (or circuit) 102, a block (or circuit) 104, and a block (or circuit) 106. The block 102 implements a storage controller. The block 104 implements a cache. In various embodiments, the block 104 may be implemented as one or more cache, devices 105a-105n. The one or more cache devices 105a-105n are generally administered as a single cache (e.g., by a cache manager of the storage controller 102). The block 106 implements a storage media (e.g., backend drive, virtual drive, etc.). The block 106 may be implemented using various technologies including, but not limited to magnetic (e.g., HDD) and Flash (e.g., NAND) memory. The block 106 may comprise one or more storage devices 108a-108n. Each of the one or more storage devices 108a-108n may include all or a portion of a file system. In various embodiments, the system 100 may be implemented using a non-volatile storage component, such as, a universal serial bus (USB) storage component, a CF (compact flash) storage component, an MMC (MultiMediaCard) storage component, an SD (secure digital) storage component, a Memory Stick storage component, and/or an xD-picture card storage component.

In various embodiments, the system 100 is configured to communicate with a host 110 using one or more communications interfaces and/or protocols. According to various embodiments, one or more communications interfaces and/or protocols may comprise one or more of a serial advanced technology attachment (SATA) interface; a serial attached small computer system interface (serial SCSI or SAS interface), a (peripheral component interconnect express (PCIe) interface; a Fibre Channel interface, an Ethernet Interface (such as 10 Gigabit Ethernet), a non-standard version of any of the preceding interfaces, a custom interface, and/or any other type of interface used to interconnect storage and/or communications and/or computing devices. For example, in some embodiments, the storage controller 102 includes a SATA interface and a PCIe interface. The host 110 generally sends data read/write commands (requests) to the system 100 and receives responses from the system 100 via the one or more communications interfaces and/or protocols. The read/write commands generally include logical block addresses (LBAs) associated with the particular data input/output (I/O). The system 100 generally stores information associated with write commands based upon the included LBAs. The system 100 generally retrieves information associated with the LBAs contained in the read commands and transfers the retrieved information to the host 110.

In various embodiments, the controller circuit 102 comprises a block (or circuit) 120, a block (or circuit) 122, block (or circuit) 124, and a block (or circuit) 126. The circuit 120 implements a host interface (I/F). The circuit 122 implements a cache manager. The circuit 124 implements a storage medium interface (I/F). The circuit 126 implements an optional random access memory (RAM) that may be configured to store images of cache management information (e.g., meta-data) in order to provide faster access. In some embodiments, the circuit 126 may be omitted. The circuits 104, 122 and 126 (when present) generally implement caching data structures and schemes in accordance with embodiments of the invention.

A virtual device (VD) may be referred to as a "backend disk". In a RAID controller, the physical backend disk is normally hidden. A "virtual" disk may be presented to the user that appears as a real backend disk that includes other additional desirable properties (e.g., "RAID-0/RAID-1/RAID-5", etc.). Once a VD is created, a user can place any data on the VD as desired. If swap data is stored on the VD, the VD may be referred to as a swap disk (or swap device). If Database data files are placed on the VD, the VD may be considered a "data disk". If log files of a file-system or a database are place on the VD, the VD may be considered a "log disk" or "log device". In FIG. 1, the storage devices 108a-108n may be considered a virtual device.

Figure 2:
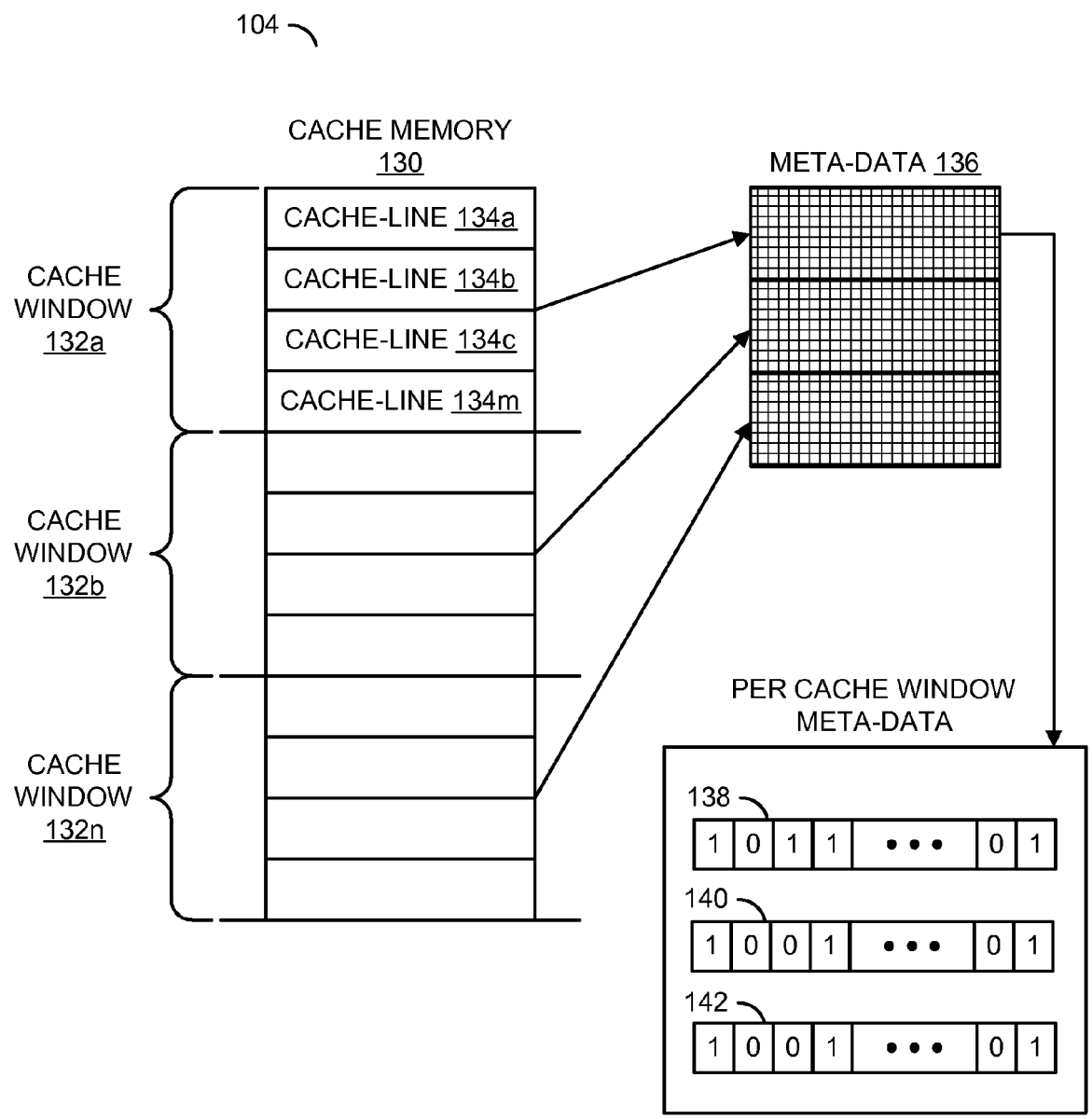
FIG. 2 is a diagram of an embodiment of the invention.

Referring to FIG. 2, a diagram is shown illustrating an example cache memory structure implemented in the block 104 of FIG. 1. Caching implementations have a uniform way of handling all cached information. In a write back cache mode, the cache memory 130 of the circuit 104 is split into several cache windows 132a-132n. Each of the cache windows 132a-132n are in turn split into several cache-lines 134a-134m. The number of cache windows 132a-132n and the number of cache-lines 134a-134m may each be a variable number that may be the same number or a different number. For example, there may be more cache windows 132a-132n than the number of cache-lines 134a-134m. In one example, the number of cache windows 132a-132n may be in the range of hundreds of thousands. The number of cache-lines 134a-134m may be in the range of tens. The particular number of cache-lines 134a-134m and cache windows 132a-132n may be varied to meet the design criteria of a particular implementation. The data that is cached is read or written from the storage media 106 in units of cache-line size. Cache data structures (meta-data) 136 are also defined per cache-line. The meta-data 136 keeps track of whether a particular cache-line is resident in the cache memory 130 and whether the particular cache-line 134a-134m is dirty.

In various embodiments, the meta-data 136 comprises a valid bitmap 138, a dirty bitmap 140, and a special bitmap 142. The bitmap 142 may be implemented as a WONRON bitmap. The first valid bitmap 138 includes a first valid flag or bit associated with each cache-line 134a-134m. The second dirty bitmap 140 includes a second dirty flag or bit associated with each cache-line 134a-134m. A state of the first flag indicates whether the corresponding cache-line is valid or invalid. A state of the second flag indicates whether the corresponding cache-line is dirty or clean. In some implementations, the cache-lines within a cache window are not physically contiguous. In that case, the per cache window meta-data 136 stores the information about the cache-lines 134a-134m (e.g. a cache-line number, etc.) which is part of one of the corresponding cache windows 132a-132n. In one example, a size of the WONRON bitmap 142 is four bytes per cache-line. The WONRON bitmap 142 may contain a flag (e.g., WONRON). The flag WONRON may track a WRITE operation followed by a READ operation prior to performing a DISCARD operation on the corresponding cache-lines 134a-134m. Each bit of the WONRON bitmap tracks the I/O pattern of interest at the level of a single one of the cache-lines 134a-134m. The meta-data 136 is stored persistently on the cache device 104 and, when available, also in RAM (the block 126) for faster access. For a very large cache memory, typically the cache-line size is large (>=64 KB) in order to reduce the size of the meta-data 136 on the cache device 104 and in the block 126.

Updates of the meta-data 136 are persisted on the cache device 104. Updating of the meta-data 136 is done at the end of each host I/O that modifies the meta-data 136. Updating of the meta-data 136 is also done during a shutdown process. Whenever a cache window 132a-132n is to be flushed (e.g., either during system recovery following a system reboot, or to free up active cache windows as part of a least recently used replacement or maintaining a minimum number of free cache windows in write back mode), the determination of which cache-lines to flush is based on picking all of the valid cache-lines that are marked dirty. Usually, the flush is done by a background task. Once the flush is done successfully, the cache-lines are again indicated as being clean (e.g., the dirty bit for the corresponding cache-lines is cleared).

Once a real cache window is allocated, any I/O (read or write) on a cache-line that is invalid is preceded by a cache read-fill operation. The cache-line is made valid by first reading the data from the corresponding LBAs on the storage medium 106 and writing the same data to the corresponding cache device. Once a cache-line is valid, all writes to the corresponding LBAs are directly written only to the cache device 104 (since the cache is in write back mode), and not written to the storage media 106. Reads on a valid cache-line are fetched from the cache device 104.

When an I/O request spans across two of the cache windows (e.g., the cache window 132a and the cache window 132b), the caching manager 122 breaks the user I/O request into two I/O sub-requests corresponding to the I/O range covered by the respective windows. The cache manager 122 internally tracks the two I/O sub-requests, and on completion of both I/O sub-requests, the original user I/O request is deemed completed. At that time, an I/O completion is signaled for the original user I/O request.

Figure 3:
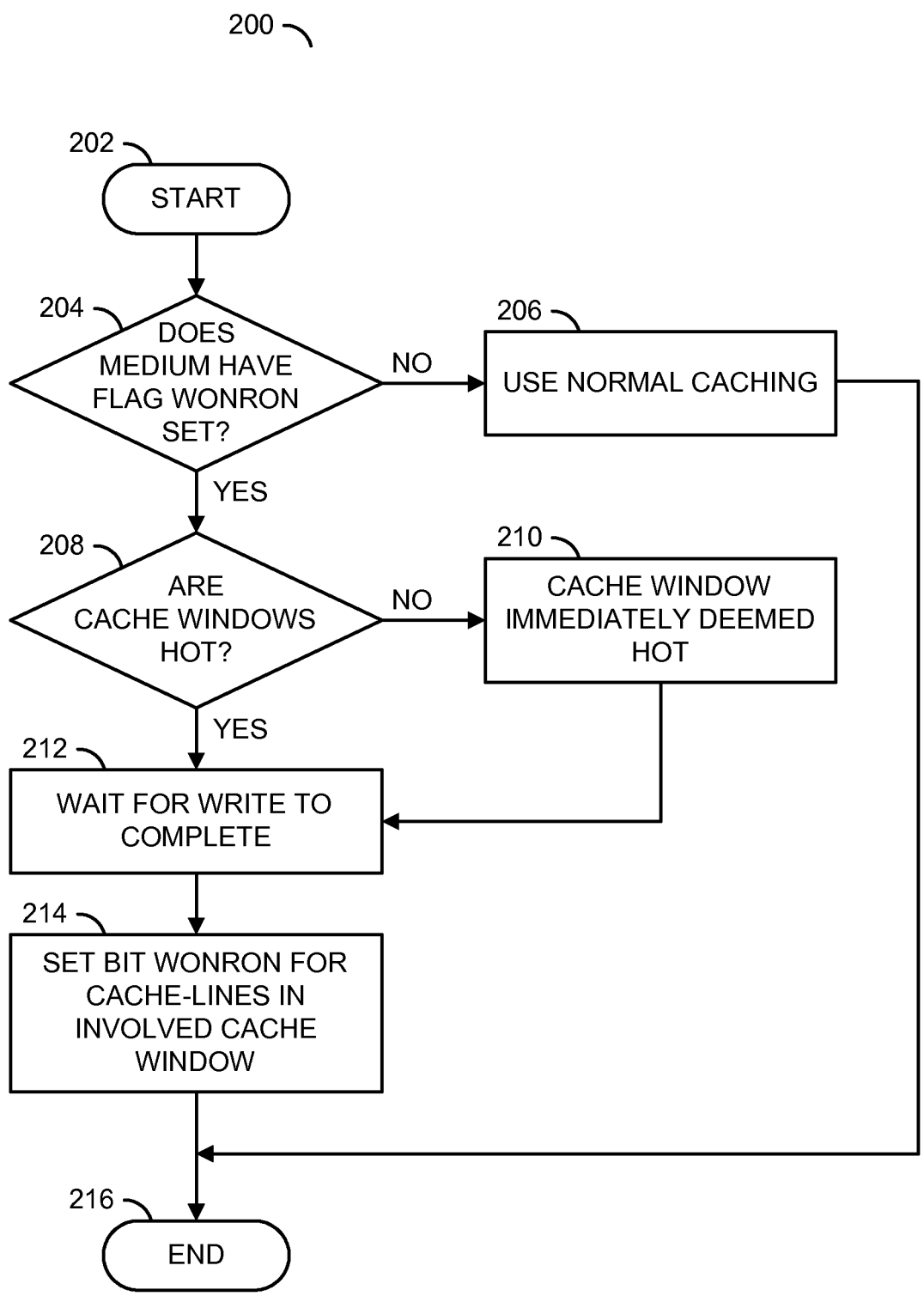
FIG. 3 is a flow diagram of an embodiment of the invention.

Referring to FIG. 3, a diagram of a method (or process) 200 is shown implementing a write operation. The method 200 generally comprises a step (or state) 202, a decision step (or state) 204, a step (or state) 206, a decision step (or state) 208, a step (or state) 210, a step (or state) 212, a step (or state) 214, and a step (or state) 216. The state 202 may start the method 200. Next, the decision state 204 determines whether the flag WONRON has been set. If not, the method 200 moves to the state 206, which implements normal caching procedures. If the flag WONRON has been set, the method 200 moves to the decision state 208. The decision state 208 determines if the cache windows are hot. If not, the method 200 moves to the state 210. The state 210 marks the cache window as immediately hot. The method 200 then moves to the state 212. If the decision state 208 determines that the cache windows are hot, the method 200 moves to the state 212. The state 212 waits for a write to complete. Next, the state 214 sets the bit WONRON for the cache-lines involved in the cache window. The method 200 then moves to the state 216. The state 216 may end the method 200.

Figure 4:
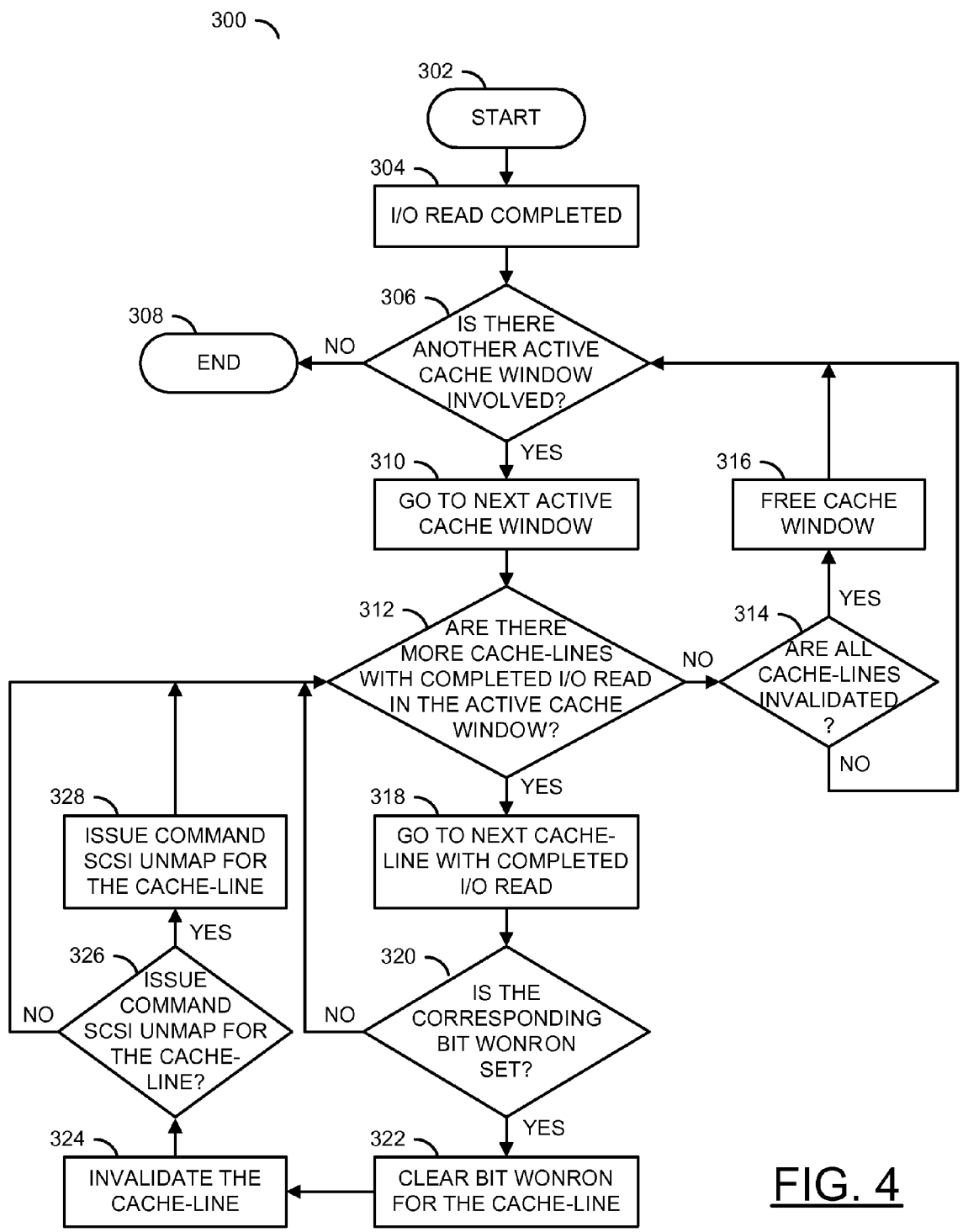
FIG. 4 is a diagram of an embodiment of the invention.

Referring to FIG. 4, a diagram of a method (or process) 300 is shown implementing a read operation. The method 300 generally comprises a step (or state) 302, a step (or state) 304, a decision step (or state) 306, a step (or state) 308, a step (or state) 310, a decision step (or state) 312, a decision step (or state) 314, a step (or state) 316, a step (or state) 318, decision step (or state) 320, a step (or state) 322, a step (or state) 324, a decision step (or state) 326, and a step (or state) 328. The state 302 may start the method 300. Next, the method 300 moves to the state 304, which waits for the I/O read to be completed. Next, the decision state 306 determines whether there is another active cache window involved. If not, the method 300 moves to state 308. The state 308 may end the method 300. If there is another active cache window involved, the method 300 moves to the state 310. The state 310 moves to the next active cache window. Next, the decision state 312 determines whether there are more cache-lines with completed I/O reads in the active cache window. If not, the method 300 moves to the decision state 314. The decision state 314 determines if all of the cache-lines in the active cache window are invalidated. If not, the method 300 moves to decision state 306. However, if all of the cache-lines are invalided, the method 300 moves to state 316. The state 316 frees the cache window. The method 300 then moves to decision state 306. In the decision state 312, if there are more cache-lines with completed I/O reads in the active cache window, the method 300 moves to state 318. The state 318 moves to the next cache-line with a completed I/O read. Next, the decision state 320 determines whether the corresponding bit WONRON for the cache-line is set. If not, the method 300 moves to decision state 312. If the corresponding bit WONRON for the cache-line is set, the method 300 moves to state 322. The state 322 clears the bit WONRON for the cache-line. Next, the state 324 invalidates this cache-line. Next, the decision state 326 determines whether to issue a command SCSI UNMAP for the cache-line. If a command SCSI UNMAP is not issued for the cache-line, the method 300 moves to decision state 312. If a command SCSI UNMAP is issued for the cache-line, the method 300 moves to state 328. The state 328 issues the command SCSI UNMAP for this cache-line. Next, the method 300 moves to decision state 312.

A swap is normally characterized by the following access pattern of data:

WRITE→READ→DISCARD

Once the "swapped out" data is "swapped in" (e.g., read from the swap device), the same data on the swap device is discarded. Using conventional approaches, the cache performance for handling different I/O workloads that have characteristics and access patterns similar to a swap I/O operation also suffer in a similar fashion as described for handling a swap I/O operation.

The circuit 100 may use tracking fields in the bitmap 142 for each of the cache windows 132a-132n. The fields in bitmap 142 track a "write followed by a read" on a completed read or write to one of the cache-lines 134a-134m. One or more of the cache-lines 134a-134m are then invalidated. The circuit 100 may implement a minimum device block size used for processing an I/O request (also called sector size) as 4 KB. In such an example, I/O requests are issued by the host interface 120 (e.g., originated from the operating system running as the host 110) in sizes of 4 KB (or multiples of 4 KB). The circuit 100 may implement the size of each of the cache-lines 134a-134m as 4 KB.

In one example, a user may specify the WONRON flag to indicate that a VD is being used specifically for the workload of the WRITE→READ→DISCARD operation. Each of the cache windows 132a-132n is mapped to some portion of the VD. Whenever an I/O request is issued on one of the cache windows 132a-132n that are active, and belong to a VD marked with "WONRON" flag in the bitmap 142, the cache manager 122 can determine that the I/O requests on the VD need to be tracked for WRITE→READ→DISCARD sequence. The cache-lines 134a-134m in each of the cache windows 132a-132n track the sequence WRITE→READ→DISCARD (e.g., WRITE followed by READ before doing a DISCARD of the cache-line data) using the bitmap 142 in each of the cache windows 132a-132n.

The WONRON bitmap 142 normally implements one bit per cache-line to track potential READ→WRITE→DISCARD sequences. The WONRON bitmap 142 is initially cleared on allocation of a cache window (irrespective of whether the cache window is allocated from the free list of cache windows or via LRU replacement of an active cache window). For an I/O read or write request on a given cache window 132a-132n, only the portions of the I/O read or write request that spam entire cache-lines 134a-134m shall be processed for WRITE→READ→DISCARD.

In one example, when receiving an I/O WRITE on a VD marked with "WONRON" flag in the bitmap 142, the cache manager 122 checks for active cache windows 132a-132n corresponding to the I/O request (e.g., cache windows 132a-132n corresponding to the write I/O request are considered HOT). If so, the bits in WONRON bitmap 142 are set for the particular cache-lines 134a-134m in the active cache windows 132a-132n on completion of the write I/O.

In another example, a WONRON hint is sent by the host 110 (e.g., through a host driver) along with the I/O WRITE request to the VD. The cache manager 122 detects the WONRON hint. If the cache windows corresponding to the write I/O request are HOT, the bits in the WONRON bitmap 142 for the cache-lines 132a-132n in the cache windows involved on completion of the write I/O.

In another example, a range of blocks (or LBAs) within the VD are preconfigured to support READ→WRITE→DISCARD capability by marking the blocks with the WONRON flag. When an I/O WRITE is received, a check is made to find whether the write I/O falls within the preconfigured WONRON block (or LBA) ranges. If the write I/O is within the percentage ranges and if the cache windows involved are HOT, the cache manager 122 sets the bits in the WONRON bitmap 142 for the particular cache-lines 134a-134m in the cache windows 132a-132n involved on completion of the write I/O.

In the example of an I/O write request, on detecting the WONRON flag (specified either directly on the entire VD), or on one or more LBA ranges in the VD, or via the WONRON hint supplied in-band with the I/O on the VD, the detected cache window 132a-132n is deemed "hot" and operates as an active cache window that is immediately allocated (e.g., without going through the route of allocating virtual windows and/or waiting for the corresponding data to become "hot"). In such an example, the application data is written in the same size as issued by the application without doing a "cache read-fill" to fill data from disk, since a read of data can not be done if data was not written in the first place. In such an example, the minimum I/O size is 4 KB or multiples of this size.

For an I/O READ request that arrives on one or more active cache windows, on I/O READ completion, the following operations may be implemented for each of the active cache windows 132a-132n involved. For each of the cache-lines 134a-134m in the active cache windows 132a-132n on which an I/O read is successfully completed on one or more of the cache devices 105a-105n, for each bit that is set in the WONRON bitmap 142, the WONRON bit is cleared for the respective on of the cache-lines 134a-134m followed by invalidating the respective cache-line. The corresponding validity bits in the "validity bitmap" in the active cache windows 132a-132n are cleared (e.g., a validity bit is set per cache-line in a particular one of cache windows 132a-132n). For example, a SCSI UNMAP command may be issued to the underlying cache device for the cache-lines 134a-134m that were invalidated. If all of the cache-lines 134a-134m in the cache windows 132a-132n that are involved are invalidated, the cache window is freed/deleted.

In the above example, the assumption is that a read command is never issued before a write command. This is because the type of data stored is of "temporary" nature (as in "swap" data) and one does not read what one has not been stored. The application already knows whether the data has been stored. The application only issues a read if the application has previously preferred a corresponding write.

In another example, multiple discreet LBA ranges for a given VD can be marked with WONRON flag. For example, LBA range from 0 to 100 MB and 1000 MB to 2000 MB could be two WONRON block ranges for a given VD. This way, one or more partitions of a VD can be configured as WONRON block ranges. In a further variation of the third embodiment, the WONRON block ranges are allowed to be specified in "units" of Cache Window size. As an example, if the Cache Window size configured is 1 MB, then the LBA range that can be specified with WONRON flag shall always be in MBs. This avoids the mixing of WONRON and non-WONRON cache-lines in an active cache window. By using this simplified scheme, the completion of sequence of writes operations on active cache windows followed by a sequence of read operations results in invalidating all cache-lines and, hence, freeing/deleting the particular one of the cache windows 132a-132n. Such an operation considerably simplifies the management of the cache windows 132a-132n involved in a WRITE→READ→DISCARD I/O pattern by isolating such patterns from other active cache windows that do not follow this I/O pattern.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The functions performed by the diagrams of FIGS. 3 and 4 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to embodiments thereof, it will be understood by those skilled in the art that various changes in form and details may be made without departing from the scope of the invention.

The invention claimed is:

1. An apparatus comprising:
   a memory configured to (i) implement a cache and (ii) store meta-data, said cache comprising one or more cache windows, each of said one or more cache windows comprising a plurality of cache-lines configured to store information; and
   a controller connected to said memory and configured to (A) process normal read/write operations in a first mode and (B) process special read/write operations in a second mode by (i) tracking a write followed by a read condition on each of said cache windows and (ii) discarding data on one or more of said cache-lines associated with said cache windows after completion of the write followed by the read condition on the one or more of said cache-lines.

2. The apparatus according to claim 1, wherein said data is discarded from the cache-lines before processing I/O requests on the said cache-lines following the write followed by the read condition on the said cache-lines.

3. The apparatus according to claim 1, wherein said memory comprises of one or more cache devices.

4. The apparatus according to claim 1, wherein the special read/write operations are tracked and controlled by a flag specified.

5. The apparatus according to claim 4, wherein said flag comprises a write once read once (WONRON) flag.

6. The apparatus according to claim 4, wherein said flag is set either (i) directly on an entire VD, (ii) on one or more LBA ranges in the VD, or (iii) via a corresponding value supplied in-band with the I/O request issued on the VD.

7. The apparatus according to claim 1, wherein the special read/write operations are processed by storing values in a bitmap on a per cache window basis, wherein one bit is stored for each cache-line stored in each of the cache windows.

8. The apparatus according to claim 7, wherein said bitmap comprises a write once read once (WONRON) bitmap.

9. The apparatus according to claim 8, wherein each of the bits stored in the WONRON bitmap are set after completion of one or more write I/O requests issued on the corresponding cachelines in an active cache window.

10. The apparatus according to claim 9, wherein on completion of read I/O requests issued on an active cache window, the bits in WONRON bitmap for the corresponding cache-lines are cleared if the bits have been set.

11. The apparatus according to claim 10, wherein clearing the bits in WONRON bitmap are followed by clearing one or more corresponding validity bits in a validity bitmap for the said cache-lines in the said cache window.

12. The apparatus according to claim 11, wherein said apparatus is further configured to discard one more corresponding data bits.

13. The apparatus according to claim 12, wherein said data bits are discarded by issuing a SCSI UNMAP or equivalent command on the cache-lines.

14. A method for caching of swap I/O requests comprising the steps of:

configuring a memory to (i) implement a cache and (ii) store meta-data, said cache comprising one or more cache windows, each of said one or more cache windows comprising a plurality of cache-lines configured to store information;

processing normal read/write operations in a first mode; and processing special read/write operations in a second mode by (i) tracking a write followed by a read condition on each of said cache windows and (ii) discarding data on one or more of said cache-lines associated with said cache windows after completion of the write followed by the read condition on the one or more of said cache-lines.

* * * * *